(12) United States Patent
Ohnishi

(10) Patent No.: US 11,607,838 B2
(45) Date of Patent: Mar. 21, 2023

(54) LIQUID EJECTING APPARATUS, LIQUID EJECTING METHOD, AND INK

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 536 days.

(21) Appl. No.: 16/451,027

(22) Filed: Jun. 25, 2019

(65) Prior Publication Data

US 2020/0016821 A1    Jan. 16, 2020

(30) Foreign Application Priority Data

Jul. 11, 2018  (JP) .............................. JP2018-131788
Mar. 12, 2019 (JP) .............................. JP2019-045209

(51) Int. Cl.
*B29C 64/112*     (2017.01)
*B41J 2/14*       (2006.01)
(Continued)

(52) U.S. Cl.
CPC .......... *B29C 64/112* (2017.08); *B29C 64/209* (2017.08); *B29C 64/264* (2017.08); *B33Y 10/00* (2014.12); *B33Y 30/00* (2014.12); *B33Y 70/00* (2014.12); *B41J 2/1433* (2013.01); *B41J 11/00214* (2021.01); *B41M 5/0023* (2013.01); *C09D 11/033* (2013.01); *C09D 11/037* (2013.01); *C09D 11/08* (2013.01); *C09D 11/101* (2013.01); *C09D 11/322* (2013.01); *B29K 2105/0032* (2013.01); *B29K 2105/06* (2013.01); *B29K 2401/00* (2013.01)

(58) Field of Classification Search
CPC ......... B33Y 70/00; B33Y 10/00; B33Y 30/00; B29C 64/112; B29C 64/209; B29C 64/264; B41J 2/1433; B41J 11/00214; B41M 5/0023; C09D 11/033; C09D 11/037; C09D 11/08; C09D 11/101; C09D 11/322; B29K 2105/0032; B29K 2105/06; B29K 2401/00
See application file for complete search history.

(56) References Cited

U.S. PATENT DOCUMENTS

2017/0088728 A1*   3/2017   Oyanagi ................ C09D 11/38

FOREIGN PATENT DOCUMENTS

JP    2013241565    12/2013
JP    2015071282    4/2015
(Continued)

OTHER PUBLICATIONS

Google Patents, machine translation of "Masaru Onishi, 'Ink and usetherof', JP2013241565A" obtained Dec. 9, 2021 (Year: 2021).*

*Primary Examiner* — Michael M. Robinson
(74) *Attorney, Agent, or Firm* — JCIPRNET

(57) ABSTRACT

A liquid ejecting apparatus, a liquid ejecting method and an ink are provided, so as to appropriately increase the strength of ink after fixing. The liquid ejecting apparatus is configured to eject an ink by an inkjet method, and includes an inkjet head configured to eject the ink. The inkjet head has a nozzle configured to eject the ink. The ink includes a resin particle having a size capable of passing through the nozzle. The resin particle contains a fibrous substance. The fibrous substance is, for example, fibers of cellulose.

3 Claims, 8 Drawing Sheets

(51) Int. Cl.
*B33Y 10/00* (2015.01)
*B33Y 30/00* (2015.01)
*B33Y 70/00* (2020.01)
*B29C 64/209* (2017.01)
*B29C 64/264* (2017.01)
*C09D 11/322* (2014.01)
*C09D 11/037* (2014.01)
*C09D 11/08* (2006.01)
*C09D 11/101* (2014.01)
*C09D 11/033* (2014.01)
*B41M 5/00* (2006.01)
*B41J 11/00* (2006.01)
*B29K 105/06* (2006.01)
*B29K 105/00* (2006.01)
*B29K 401/00* (2006.01)

(56) References Cited

FOREIGN PATENT DOCUMENTS

| | | |
|---|---|---|
| JP | 2017087617 | 5/2017 |
| WO | 2017135425 | 8/2017 |

\* cited by examiner

LIQUID EJECTING APPARATUS, LIQUID EJECTING METHOD, AND INK

CROSS REFERENCE TO RELATED APPLICATIONS

This application claims the priority benefits of Japanese Patent Application No. 2018-131788, filed on Jul. 11, 2018, and Japanese Patent Application No. 2019-45209, filed on Mar. 12, 2019. The entirety of the above-mentioned patent application is hereby incorporated by reference herein and made a part of this specification.

TECHNICAL FIELD

The present disclosure relates to a liquid ejecting apparatus, a liquid ejecting method, and an ink.

BACKGROUND ART

A building apparatus (3D printer) that builds an object using inkjet heads is conventionally known (for example, see Patent Literature 1). In such a building apparatus, for example, an object is built by additive manufacturing in which a plurality of ink layers formed by inkjet heads are added one after another. Such building apparatuses find wide application in creating three-dimensional objects without using molding dies (for example, molds) instead of engineering plastics and super engineering plastics used in common molding.

Patent Literature 1: Japanese Unexamined Patent Publication No. 2015-071282

SUMMARY

When an object is built using inkjet heads, for example, UV curable ink is used as ink used as a building material. When ink is ejected by inkjet heads, however, ink is ejected from minute nozzles, which imposes limitations on materials that can be used. For this reason, for example, when a part or a final product that requires mechanical strength is created, the object may lack strength in some applications of the object. There has been a desire for appropriately building an object with higher strength when an object is built using inkjet heads.

High strength of ink may be required not only when an object is built but also when, for example, an image is drawn on a medium by an inkjet printer. It has therefore been desired to increase the strength of ink after fixing in the cases other than building an object. The present disclosure provides a liquid ejecting apparatus, a liquid ejecting method, and an ink that can solve the problem above.

The inventor of the subject application has conducted elaborate studies on a method of increasing the strength of ink after fixing, for example, when an object is built using inkjet heads. The inventor first contemplated increasing the strength of an object by adding a high-viscosity or solid additive (for example, polymer resin material) to ink. When such an additive is added to ink, however, nozzles are easily clogged with ink, possibly causing frequent ejection failure. Consequently, stability and reliability of the apparatus are significantly reduced.

The inventor of the subject application then contemplated adding a fibrous substance having a diameter smaller than the diameter of a nozzle to ink. Even in this case, however, it is necessary to add a substance having a molecular weight at a certain degree or more in order to appropriately increase the strength of the object. More specifically, in this case, for example, a string-like substance easily tangled is used as the fibrous substance. Then, in this case, a large amount of the fibrous substance is tangled in the ink, although its diameter is small, so that the nozzles are likely to be clogged. Also in this case, ejection failure may frequently occur, and stability and reliability of the apparatus may be significantly reduced.

To cope with this, the inventor of the subject application has further conducted elaborate studies and contemplated adding the fibrous substance contained in a resin particle to ink, rather than directly adding the fibrous substance to ink. With this configuration, the strength of an object can be appropriately increased, for example, by building an object with ink including a fibrous substance. In this case, for example, the fibrous substances contained in different resin particles are not directly in contact with each other. This configuration thus can prevent assembly of a large amount of fibrous substance. This also can appropriately prevent, for example, clogging of the nozzles due to the fibrous substance. In this case, the fibrous substance is contained in a resin particle having a size that can pass through a nozzle, whereby ink can be stably ejected from the nozzles.

The inventor of the subject application has further conducted elaborate studies and found the features necessary for achieving such effects. This finding has led to the completion of the disclosure. In order to solve the problem above, the present disclosure provides a liquid ejecting apparatus configured to eject an ink by an inkjet method. The liquid ejecting apparatus includes an inkjet head configured to eject the ink. The inkjet head has a nozzle configured to eject the ink. The ink includes a resin particle having a size capable of passing through the nozzle. The resin particle contains a fibrous substance.

In such a configuration, for example, a layer of ink is formed of the ink including the fibrous substance, whereby the strength of ink can be appropriately increased after the ink changes into a solid state. The fibrous substance is not directly added to ink but the fibrous substance is contained in a resin particle having a size capable of passing through the nozzle. For example, this configuration appropriately prevents clogging of the nozzle due to the fibrous substance and enables stable ejection of ink from the nozzle. This configuration can, for example, appropriately increase the strength of ink after fixing.

In this configuration, the liquid ejecting apparatus is, for example, a building apparatus configured to build a three-dimensional object. In this case, the inkjet head ejects, for example, ink serving as a material of the object. This configuration can, for example, appropriately increase the strength of the object. In this case, a support layer may be formed around the object being built, if necessary. The support layer refers to, for example, a configuration that supports at least a part of the object being built. In this case, the liquid ejecting apparatus further includes, for example, a head for a support material configured to eject a material of the support layer. The support layer is formed during building if necessary and removed after building of the object is completed. The head for a support material therefore may eject, for example, ink not including a fibrous substance as a material of the support layer. This configuration can, for example, appropriately form a support layer that is easily removed.

The liquid ejecting apparatus may be, for example, a printing apparatus configured to perform printing on a medium. In this case, the inkjet head, for example, ejects ink toward the medium. This configuration can, for example, appropriately increase the strength of a printed matter. In this case, increasing the strength of a printed matter means, for example, increasing abrasion resistance or flexion resistance of ink adhering to the medium.

In this configuration, the ink refers to a functional liquid. More specifically, for example, when the liquid ejecting apparatus is a building apparatus, the ink can be considered as a liquid used as the material of an object. When the liquid ejecting apparatus is a printing apparatus, the ink can be considered as, for example, a liquid for drawing an image on a medium. The ink can be considered as, for example, a liquid ejected by the inkjet head by the inkjet method.

In this configuration, it is preferable that the liquid ejecting apparatus further includes a fixing device for ink. The fixing device for ink is, for example, a device that fixes ink by changing the ink having been ejected from the nozzles into a solid state. In this case, the fibrous substance can be considered as, for example, a component for increasing the strength of ink after fixing. Increasing the strength of ink after fixing means that, for example, when the strength after fixing of ink is compared under the same conditions except for the presence/absence of the fibrous substance, ink including the fibrous substance has a higher strength. For example, cellulose fibers which are fibers of cellulose can be suitably used as the fibrous substance. In this case, for example, cellulose fibers with a length of about 5 µm or less (for example, about 0.03 to 2 µm, preferably about 0.2 to 0.8 µm) can be suitably used. This configuration can appropriately increase the strength of ink, for example, after the ink changes into a solid state. A substance other than fibers of cellulose may be used as the fibrous substance.

In this configuration, for example, ink that includes a liquid component at least at a point of time when ink is ejected from the nozzle may be used as the ink. In this case, it is preferable that the resin particle that contains the fibrous substance is, for example, dispersed in the liquid component. With this configuration, for example, the resin particle can be appropriately contained in the ink.

More specifically, for example, ink that includes a curable substance that is cured by radiation of ultraviolet rays is suitably used as the ink. In this case, the curable substance is, for example, a substance that is in a non-solid state such as liquid before being irradiated with ultraviolet rays and changes into a solid state by radiation of ultraviolet rays. For example, a monomer can be suitably used as the curable substance. For example, an oligomer may be used as the curable substance. In this case, an oligomer having a large molecular weight at a certain degree or more may be used as the resin particle containing the fibrous substance.

In this case, the resin particle that contains the fibrous substance may be dispersed in the curable substance in a liquid state before curing. In this case, the liquid ejecting apparatus further includes, for example, an ultraviolet ray irradiator configured to irradiate the ink having been ejected from the nozzle with ultraviolet rays, as the fixing device for ink. With such a configuration, for example, the ink can be appropriately changed into a solid state. In this case, the ink changes from liquid to a solid state without substantially changing its volume. Such ink therefore can be suitably used, for example, when an object is built.

For example, an ink that includes a solvent volatilized and removed after being ejected from the nozzle may be used as the ink. In this case, for example, an aqueous solvent such as water or an organic solvent (for example, non-aqueous organic solvent) may be used as the solvent. In this case, the liquid ejecting apparatus further includes, for example, a drying device configured to dry the ink having been ejected from the nozzle, as a fixing device for ink. With such a configuration, for example, ink can be appropriately changed into a solid state. In this case, the volume of the ink decreases because of evaporation of the solvent while the ink changes from liquid to a solid state. It is therefore preferable that such ink is used in applications in which a volume change of ink during fixing does not matter. More specifically, such ink can be suitably used, for example, when an image is drawn on a medium.

For example, an ink that produces heat by itself by radiation of energy rays (fast-drying ink) can be suitably used as the ink including a solvent. In this case, the ink includes, for example, an exothermic substance that absorbs energy rays to produce heat. In this case, the drying device for ink irradiates the ink with energy rays to produce heat from the ink. The drying device for ink thus evaporates the solvent in the ink and changes the ink into a solid state. With such a configuration, for example, ink can be dried appropriately in a short time. In this case, for example, ultraviolet rays can be suitably used as the energy rays.

In this configuration, ink that further includes a colorless inorganic pigment may be used as the ink. In this case, it is preferable that the inorganic pigment is a colorless and transparent pigment. As used herein, the inorganic pigment being colorless or transparent means, for example, being substantially colorless or transparent so as to sufficiently reduce the effect on the color of ink. A white pigment may be used as such an inorganic pigment.

In another configuration of the present disclosure, a liquid ejecting method and ink having similar features as described above may be used. This configuration also achieves, for example, the similar effects as described above. Such a liquid ejecting method can be considered as, for example, a method of producing an object or a printed matter.

The present disclosure can, for example, appropriately increase the strength of ink after fixing.

BRIEF DESCRIPTION OF THE DRAWINGS

FIGS. 1A to 1C are diagrams illustrating an example of a liquid ejecting apparatus 10 according to an embodiment of the present disclosure, in which FIG. 1A illustrates an example of the configuration of the main part of the liquid ejecting apparatus 10, FIG. 1B illustrates an example of the configuration of a head 12 in the liquid ejecting apparatus 10, and FIG. 1C illustrates an example of an object 50 which is a product created by the liquid ejecting apparatus 10.

FIG. 2C illustrates a modification of ink for an object.

FIGS. 3A to 3C are diagrams illustrating a modification of the liquid ejecting apparatus 10, in which FIG. 3A illustrates an example of the configuration of the main part of the liquid ejecting apparatus 10 in the present modification, FIG. 3B illustrates an example of the configuration of the head 12 in the liquid ejecting apparatus 10, and FIG. 3C illustrates an example of the printed matter printed by the liquid ejecting apparatus 10.

FIGS. 4A to 4D are diagrams illustrating ink used in the present example in more detail, in which FIGS. 4A and 4B illustrate an example of the state after fixing of ink in the present example, and FIGS. 4C and 4D illustrate an example of the state after fixing of evaporation-drying ink which is ink fixed when a solvent 202 is volatilized and removed.

FIGS. 5A to 5D are diagrams illustrating a modification of ink, in which FIG. 5A illustrates an example of the configuration of ink including a pigment 208 such that the pigment 208 is included only on the inside of a resin particle 204, FIG. 5B illustrates an example of the state after fixing of the ink illustrated in FIG. 5A, FIG. 5C illustrates an example of the configuration of ink including the pigment 208 such that the pigment 208 is included only on the outside of a resin particle 204, and FIG. 5D illustrates an example of the state after fixing of the ink illustrated in FIG. 5C.

FIGS. 7A to 7D are diagrams illustrating the configuration of ink further including an inorganic pigment as an extender pigment, in which FIGS. 7A to 7C illustrate an example of the configuration of ink further including an extender pigment 210, and FIG. 7D illustrates an example of the state after fixing of the ink further including the extender pigment 210.

DESCRIPTION OF EMBODIMENTS

Figure 1A:
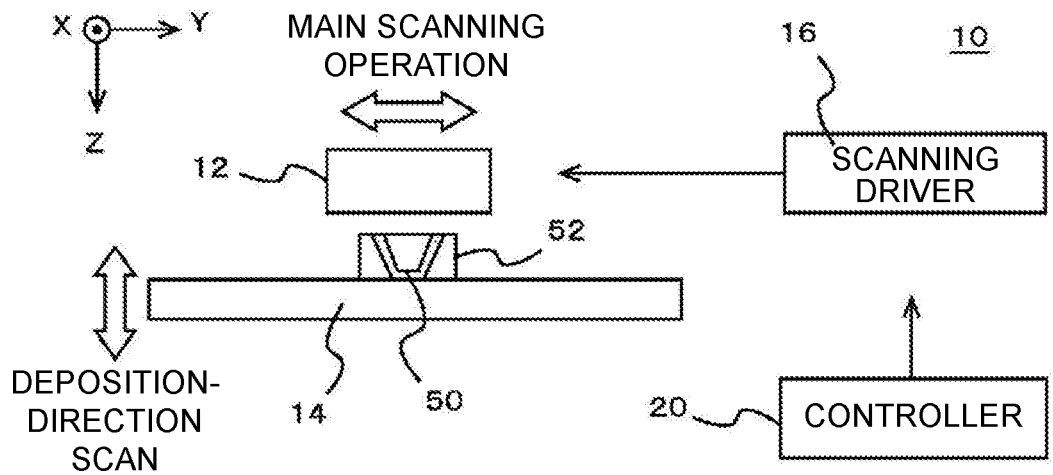
Figure 1B:
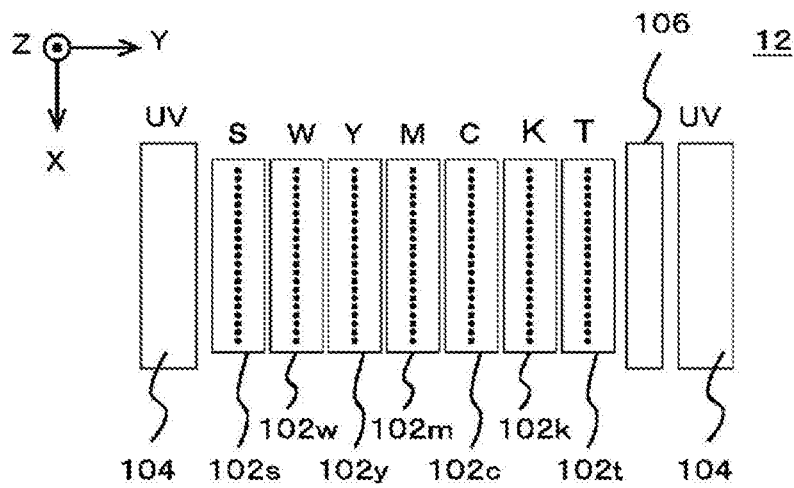
Figure 1C:
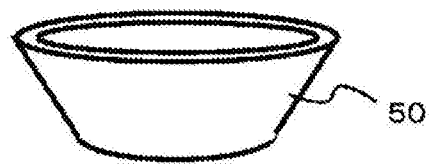

Embodiments of the present disclosure will be described below with reference to the figures. FIGS. 1A to 1C illustrate an example of a liquid ejecting apparatus 10 according to an embodiment of the present disclosure. FIG. 1A illustrates an example of the configuration of the main part of the liquid ejecting apparatus 10. FIG. 1B illustrates an example of the configuration of a head 12 in the liquid ejecting apparatus 10. FIG. 1C illustrates an example of an object 50 which is a product created by the liquid ejecting apparatus 10.

In the present example, the liquid ejecting apparatus 10 is a building apparatus (3D printer) that builds a three-dimensional object 50 by additive manufacturing. In this case, additive manufacturing refers to, for example, a method of building an object 50 by adding a plurality of layers one after another. The object 50 refers to, for example, a three-dimensional structure. The liquid ejecting apparatus 10 may have the same or similar features as known building apparatuses except for the points described below. More specifically, the liquid ejecting apparatus 10 may have the same or similar features as known building apparatuses that build an object by ejecting liquid droplets as a material of the object 50 using inkjet heads, except for the points described below. The liquid ejecting apparatus 10 may further include, for example, a variety of configurations necessary for building the object 50, in addition to the configuration illustrated in the figures.

In the present example, the liquid ejecting apparatus 10 includes a head 12, a stage 14, a scanning driver 16, and a controller 20. The head 12 is a part that ejects a material of the object 50. In the present example, ink is used as a material of the object 50. In this case, ink refers to, for example, a functional liquid. In the present example, ink may be, for example, a liquid ejected from an inkjet head. In this case, the inkjet head refers to, for example, an ejection head that ejects ink droplets by the inkjet method.

More specifically, the head 12 ejects ink that is cured under a predetermined condition as a material of the object 50 from a plurality of inkjet heads. The landed ink is then cured to add layers one after another to form the object 50. In the present example, ultraviolet curable ink (UV ink, UV curable ink) that is cured from a liquid state by radiation of ultraviolet rays is used as the ink. The features of the ink used as a material of the object 50 will be described in more detail later.

The head 12 further ejects a material of a support layer 52, in addition to the material of the object 50. The head 12 thus forms the support layer 52 around the object 50, if necessary. The support layer 52 refers to, for example, a deposited structure that surrounds the outer periphery of the object 50 being built to support the object 50. The support layer 52 can be considered as, for example, a configuration that supports at least a part of the object 50 being built. The support layer 52 is formed during building of the object 50 if necessary and removed after building of the object 50 is finished.

The stage 14 is a table-like member (building stage, base) that supports the object 50 being built and is disposed at a position facing the inkjet heads in the head 12. The object 50 being built is placed on the upper surface of the stage 14. In the present example, the stage 14 is configured such that at least the upper surface is movable in the deposition direction (the Z direction in the figure) and is driven by the scanning driver 16 so that at least the upper surface is moved with the progress of building of the object 50. In this case, the deposition direction is, for example, a direction in which the building material is deposited in additive manufacturing. More specifically, in the present example, the deposition direction is a direction orthogonal to the main scanning direction (the Y direction in the figure) and the sub scanning direction (the X direction in the figure) preset in the liquid ejecting apparatus 10.

The scanning driver 16 is a driver that allows the head 12 to perform a scanning operation to move relative to the object 50 being built. As used herein, moving relative to the object 50 being built means, for example, moving relative to the stage 14. Allowing the head 12 to perform a scanning operation means, for example, allowing the inkjet heads of the head 12 to perform a scanning operation. In the present example, the scanning driver 16 allows the head 12 to perform a main scanning operation (Y scan), a sub scanning operation (X scan), and a deposition-direction scan (Z scan).

In this case, the main scanning operation refers to, for example, the operation of ejecting ink while moving relative to the object 50 being built in the main scanning direction. In the present example, the liquid ejecting apparatus 10 performs a building operation, for example, by the multi-pass method (multi-pass printing method). In this case, performing a building operation by the multi-pass method means, for example, performing a main scanning operation multiple times at the same position in the operation of forming one layer of ink. The building operation may be performed by the single-pass method depending on the quality required for building. In this case, performing a building operation by the single-pass method means, for example, performing a main scanning operation one time at the same position in the operation of forming one layer of ink.

The sub scanning operation refers to, for example, the operation of moving relative to the object 50 being built in the sub scanning direction orthogonal to the main scanning direction. The sub scanning operation may be considered as, for example, the operation of moving relative to the stage 14 in the sub scanning direction by a preset amount of feeding. In the present example, the scanning driver 16 allows the head 12 to perform a sub scanning operation, for example, in the interval between the main scanning operations. The deposition-direction scan refers to, for example, the operation of moving the head 12 relative to the object 50 being built in the deposition direction. The scanning driver 16 allows the head 12 to perform a deposition-direction scan in accordance with the progress of building operation to adjust the relative position of the inkjet heads to the object 50 being built in the deposition direction.

The controller 20 is, for example, a CPU of the liquid ejecting apparatus 10 and controls each part of the liquid ejecting apparatus 10 to control the building operation in the liquid ejecting apparatus 10. More specifically, the controller 20 controls each part of the liquid ejecting apparatus 10, for example, based on shape information and color information of the object 50 to be built. According to the present example, the object 50 can be appropriately built.

A more specific configuration of the head 12 will now be described. In the present example, the head 12 has a plurality of inkjet heads, a plurality of ultraviolet ray irradiators 104, and a flattening roller 106. As illustrated in FIG. 1B, a plurality of inkjet heads include an inkjet head 102s, an inkjet head 102w, an inkjet head 102y, an inkjet head 102m, an inkjet head 102c, an inkjet head 102k, and an inkjet head 102t. These inkjet heads are disposed, for example, in a row in the main scanning direction so as to be aligned in the sub scanning direction. Each inkjet head has a nozzle row including a plurality of nozzles arranged in a row in a predetermined nozzle row direction on a surface facing the stage 14. In the present example, the nozzle row direction is a direction parallel to the sub scanning direction.

Of these inkjet heads, the inkjet head 102s is an example of the head for a support material and ejects a material of the support layer 52. In the present example, UV curable ink with a lower degree of cure by ultraviolet rays compared with the material of the object 50 is used as a material of the support layer 52. For example, known materials for a support layer can be suitably used as a material of the support layer 52.

The inkjet head 102w, the inkjet head 102y, the inkjet head 102m, the inkjet head 102c, the inkjet head 102k, and the inkjet head 102t are inkjet heads that eject ink serving as a material of the object 50. In the present example, ink including cellulose fibers as an example of the fibrous substance is used as a material of the object 50 ejected from these inkjet heads. The features of the ink including cellulose fibers will be described in more detail later.

Of the inkjet heads that eject ink as the material of the object 50, the inkjet head 102w ejects white (W) ink. In the present example, white ink is an example of light-reflective ink and is used, for example, when a region having the property of reflecting light (light-reflective region) is formed in the object 50. This light-reflective region reflects light incident from the outside of the object 50, for example, when the surface of the object 50 is colored in full-color representation. Full-color representation refers to, for example, representation of color with a possible combination in subtractive color mixing of inks of process colors (basic colors). In this case, an interior region that forms the interior of the object 50 may be formed of white ink so that the interior region functions as a light-reflective region.

The inkjet head 102y, the inkjet head 102m, the inkjet head 102c, and the inkjet head 102k are inkjet heads for coloring for use in building a colored object 50, and each ejects ink of the corresponding color of inks of a plurality of colors used for coloring (inks for coloring). More specifically, the inkjet head 102y ejects yellow (Y) ink. The inkjet head 102m ejects magenta (M) ink. The inkjet head 102c ejects cyan (C) ink. The inkjet head 102k ejects black (K) ink. In this case, the colors Y, M, C, and K are an example of the process colors. The inkjet head 102t ejects clear ink. The clear ink is, for example, a colorless transparent (T) ink of clear color. The clear ink is used, for example, together with ink for coloring when a colored region to be colored in the object 50 is formed. In the present example, the diameter of each nozzle in the inkjet head in the head 12 is 30 to 50 μm. With such a configuration, for example, ink can be appropriately ejected at a high resolution.

A plurality of ultraviolet ray irradiators 104 are UV curing devices for curing (polymerizing and curing) ink and generate ultraviolet rays to cure UV curable ink. In this case, the ultraviolet ray irradiators 104 irradiate the ink having been ejected from the nozzles in each inkjet head with ultraviolet rays to change the landed ink into a solid state. The ultraviolet ray irradiators 104 thus function as a fixing device for ink. In this case, the fixing device for ink refers to, for example, a device that fixes ink by changing the ink having been ejected from the nozzles into a solid state. In the present example, a plurality of ultraviolet ray irradiators 104 are disposed on one end side and the other end side in the main scanning direction of the head 12 such that a row of inkjet heads is sandwiched therebetween. For example, an ultraviolet LED (UV LED) can be suitably used as the ultraviolet ray irradiator 104. A metal-halide lamp or a mercury lamp, for example, may be used as the ultraviolet ray irradiator 104. The flattening roller 106 is a flattening device for flattening a layer of ink formed during building of the object 50. The flattening roller 106 comes into contact with the surface of a layer of ink, for example, in the main scanning operation to remove part of the ink before curing, thereby flattening the layer of ink.

Layers of ink that constitute the object 50 can be formed appropriately by using the head 12 having the configuration described above. In this case, for example, a plurality of layers of ink are formed by adding layer by layer while each layer of ink is cured, based on data obtained by decomposing data representing an object into slices. With such a configuration, for example, as illustrated in FIG. 1C, the object 50 as a product of the liquid ejecting apparatus 10 can be appropriately built. The state illustrated in FIG. 1C is the state in which the support layer 52 is removed, for example, by washing after the operation of building is finished in the liquid ejecting apparatus 10.

Here, as described above, in the present example, ink containing cellulose fibers is used as a material of the object 50. This configuration can, for example, appropriately increase the strength of ink after the ink changes into a solid state. In this case, the strength of ink after the ink changes into a solid state refers to, for example, the mechanical strength of ink after curing. High strength of ink after changing into a solid state means, for example, that when an external force is applied to the object 50 built in a predetermined shape, the force that breaks the object 50 is large.

As described above, in the present example, the support layer 52 is formed around the object 50, if necessary. Then, in this case, it may be difficult to subsequently remove the support layer 52 if the strength is higher than necessary. For this reason, it is preferable that ink that does not include cellulose fibers is used as the ink ejected by the inkjet head 102s. In this case, as described above, a known material for a support layer can be suitably used.

The features of ink for an object that is ink used as a material of the object 50 in the present example will now be described in more detail. In this case, the ink for an object is ink ejected from the inkjet heads other than the inkjet head 102s in the head 12.

Figure 2A:
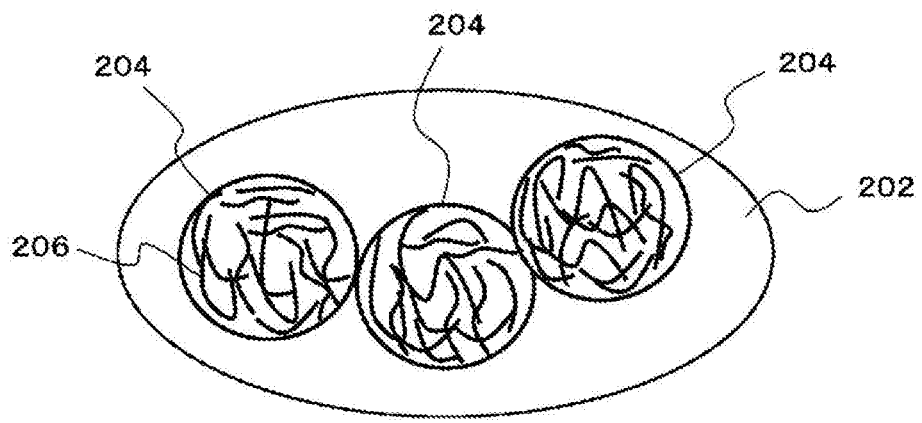
FIGS. 2A to 2C are diagrams illustrating the features of ink for an object in more detail, in which FIG. 2A schematically illustrates an example of composition of clear ink which is colorless ink for an object, FIG. 2B schematically illustrates an example of composition of ink for an object of a color other than clear ink.
Figure 2B:
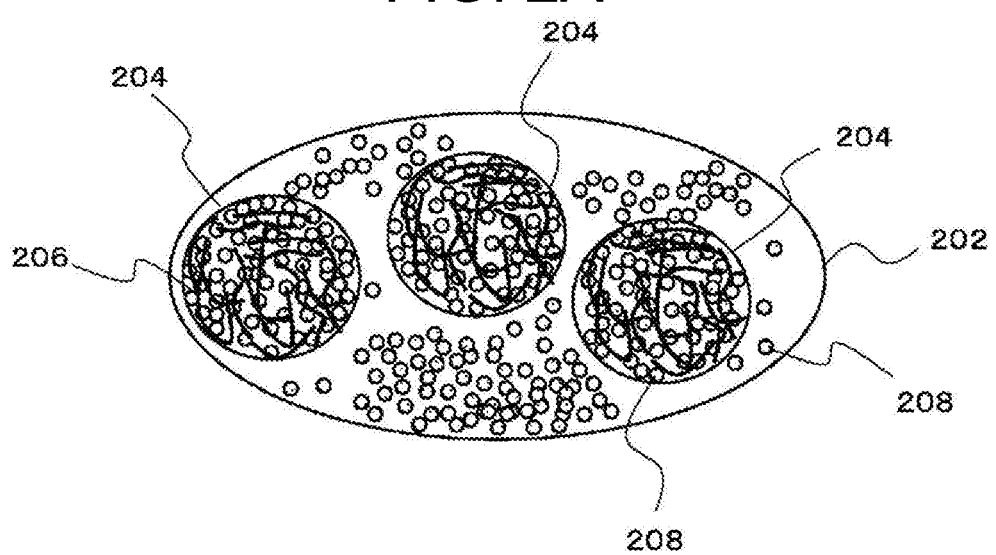
Figure 2C:
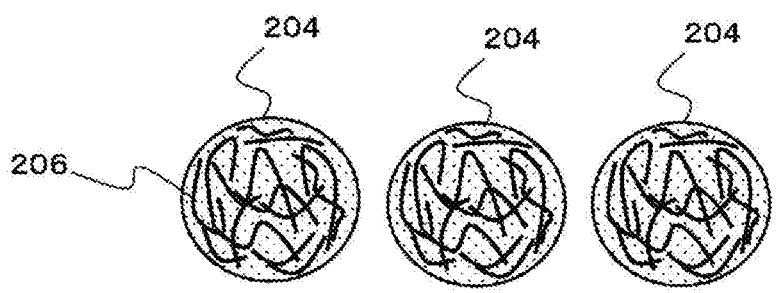

FIGS. 2A to 2C are diagrams illustrating the features of ink for an object in more detail. FIG. 2A schematically illustrates an example of composition of clear ink which is colorless ink for an object. FIG. 2B schematically illustrates an example of composition of ink for an object of a color other than clear ink. The ink for an object used in the present example may have the same or similar features as known UV curable ink for use in building an object 50, except for the points described below. More specifically, the ink for an object used in the present example may further include the same or similar components as known UV curable ink, in addition to the components described below.

As described above, in the present example, the ink for an object includes cellulose fibers. In this case, cellulose fibers are not directly included but cellulose fibers are included, for example, in a state in which cellulose fibers are contained in a resin particle, as illustrated in the figures. In this case, containing cellulose fibers in a resin particle means, for example, that a resin particle holds cellulose fibers so as to wrap them inside. More specifically, in the case of clear ink, as illustrated in FIG. 2A, the ink for an object includes a solvent 202, resin particles 204, and cellulose fibers 206. In the case of ink of a color other than clear ink, as illustrated in FIG. 2B, the ink for an object further includes a pigment 208. For example, a known nano pigment can be suitably used as pigment 208. For example, it is preferable that a particulate pigment with an average particle size of 30 nm or less (nano pigment particle) is used as the nano pigment. With such a configuration, for example, vivid color ink with a high transparency can be appropriately obtained. It is more preferable that the average particle size of nano pigment is 10 nm or less.

The solvent 202 is a liquid component in ink. In this case, the liquid component in ink refers to, for example, a component that is liquid before the ink changes into solid. In the present example, before the ink changes into solid means before ink is cured by radiation of ultraviolet rays. More specifically, in the present example, the solvent 202 is a liquid including a monomer (UV curable monomer) that is a curable substance as the main component (main solvent). In this case, the curable substance is, for example, a substance that is cured by radiation of ultraviolet rays. The curable substance can be considered as, for example, a substance that is in a non-solid state such as liquid before being irradiated with ultraviolet rays and changes into a solid state by radiation of ultraviolet rays. Including a curable substance as the main component means that the curable substance makes up 50% by weight or more of the solvent 202. The proportion of the curable substance in the solvent 202 is, for example, 80% or more, preferably 90% or more.

In the present example, the solvent 202 includes one or both of a monomer and an oligomer as the main component, as a curable substance. In this case, including both of a monomer and an oligomer as the main component means that the total proportion of monomer and oligomer makes up 50% by weight or more of the solvent 202. Also in the present example, for example, a variety of components such as a polymerization initiator (UV curing initiator) are dissolved or dispersed in the solvent 202, in the same or similar manner as known UV curable ink.

The resin particles 204 are particles of resin such as synthetic resin or latex resin and present in ink in a dispersed state in the solvent 202. In this case, dispersing the resin particles 204 in the solvent 202 means, for example, dispersing the resin particles 204 in a not-dissolved state in the solvent 202 as a dispersoid. For example, an oligomer with a large molecular weight at a certain degree or more or a thermoplastic resin may be used as the resin particles 204. In the present example, the resin particles 204 are particles of a size that can pass through a nozzle of each inkjet head in the head 12 (see FIGS. 1A and 1B) and contain cellulose fibers 206. To enable the resin particles 204 to pass through the nozzle, the average value of diameter of the resin particle 204 is preferably, for example, in a range that does not exceed one-fifth of the diameter of the nozzle. The average value of diameter of the resin particle 204 is more preferably one-tenth or smaller, further preferably one-twentieth or smaller of the diameter of the nozzle.

In the present example, for example, cellulose nanofibers which are fibers of cellulose with a thickness of 100 nm or less and a length of 10 µm or less are used as cellulose fibers 206. For example, cellulose nanofibers (CNF), cellulose nanocrystal, or cellulose nanowhiskers may be used as such fibers of cellulose. In the following, these fibers of cellulose are collectively referred to as cellulose nanofibers unless otherwise specified, for convenience of explanation. Such cellulose nanofibers can be considered as, for example, being almost transparent and colorless. For example, cellulose fibers (for example, nanofibers) with a length of about 5 µm or less (for example, about 0.03 to 2 µm, preferably about 0.2 to 0.8 µm) can be suitably used as cellulose fibers 206. It is preferable that a plurality of cellulose fibers 206 are contained in each resin particle 204.

When the ink for an object is ink of a color other than clear ink as described above, the ink for an object further includes a pigment 208 as a colorant exhibiting the color of ink. More specifically, in the present example, for example, as illustrated in FIG. 2B, the pigment 208 is added such that the pigment 208 is included both on the inside and on the outside of the resin particle 204. In this case, the pigment 208 being included on the inside of the resin particle 204 means that the pigment 208 is contained in the resin particle 204. The pigment 208 being included on the outside of the resin particle 204 means that the pigment 208 is directly included in the solvent 202, rather than being contained in the resin particle 204. In a modification of the ink, the pigment 208 may be added such that the pigment 208 is included on only one of the inside or the outside of the resin particle 204. The pigment 208 may be, for example, contained in a resin particle separately from cellulose fibers 206. In this case, the object ink further includes, for example, a resin particle that does not contain cellulose fibers 206 and contains the pigment 208, in addition to the resin particle 204 containing cellulose fibers 206. In this case, the resin particle that contains the pigment 208 can be considered as, for example, a micro-encapsulated pigment.

The ink including the resin particles 204 dispersed in the solvent 202 as in the present example is conventionally known as disclosed, for example, in Japanese Unexamined Patent Publication No. 2013-241565 and Japanese Unexamined Patent Publication No. 2017-87617. The resin particles 204 in the present example therefore can be produced in the same or similar manner as the methods disclosed in these literatures. In this case, the cellulose fibers 206 can be contained in the resin particles 204 by producing the resin particles 204 in a state in which the cellulose fibers 206 are added. In this case, for example, the cellulose fibers 206 can be contained in the resin particles 204 in the process of producing the resin particles 204 by performing emulsion polymerization or suspension polymerization. More specifically, in this case, the cellulose fibers 206 are, for example, shaped like a ball (resin ball) by interfacial tension between liquids and taken into the resin particles 204 in the process of performing emulsion polymerization or suspension polymerization in the process of producing the resin particles 204. With such a configuration, for example, ink including a plurality of resin particles 204 (a large number of resin particles 204) can be appropriately produced. In addition, the cellulose fibers 206 can be contained in the resin particles 204. The resin particles 204 containing the cellulose fibers 206 may be produced, for example, by the same or similar method as a method of producing toner in electrophotography. In this case, for example, known methods such as a polymerization method and a crushing method can be suitably used.

In such a configuration, the cellulose fibers 206 are not directly added to ink but the cellulose fibers 206 are contained in the resin particle 204 having a size that can pass through a nozzle, whereby, for example, entanglement of many cellulose fibers 206 can be appropriately prevented. This can appropriately prevent, for example, agglomeration of many cellulose fibers 206 into a size that exceeds the diameter of a nozzle. More specifically, for example, when an inkjet head with a small nozzle diameter with high resolution is used as in the present example, for example, adding a long fibrous filler or a resin material with a large molecular weight directly to ink causes entanglement of the added filler or material in the ink and tends to produce a substance having a size that clogs the nozzle. For example, when a fibrous (fiber-like) substance is directly added in ink, entanglement or agglomeration may occur to cause agglomeration or increase in viscosity of ink. Then, in this case, ink ejection failure frequently occurs to make it difficult to keep stable ejection. Adding the cellulose fibers 206 directly to ink thus may cause a similar situation.

In general, a filler with a large specific gravity and a large particle size tends to precipitate in ink and causes clogging in an ink flow path or a damper or change in viscosity of the stored ink. Consequently, ejection becomes unstable, and stably ejecting ink tends to be difficult. On the other hand, when ejection stability is a higher priority and a filler is not used, for example, it may be difficult to achieve high durability. By contrast, in the present example, the cellulose fibers 206 are not directly dispersed in ink but the cellulose fibers 206 are contained in the resin particle 204, as described above. With such a configuration, for example, the cellulose fibers 206 can be added to ink in a state in which entanglement or agglomeration is less likely to occur. Ink including the cellulose fibers 206 thus can be used properly while the ejection stability is kept. In this case, the cellulose fibers 206 function as a filler, whereby the ink after fixing can appropriately achieve high strength and flexibility. According to this example, therefore, for example, clogging of nozzles due to cellulose fibers 206 can be appropriately prevented, and ink can be ejected stably from nozzles. This configuration can appropriately achieve high durability, for example, while appropriately preventing ejection failure.

In the example of the configuration above, the pigment 208 is used as a colorant for the ink for an object of a color other than clear ink. However, in a modification of the ink for an object, a dye may be used as a colorant of ink. FIG. 2C illustrates a modification of the ink for an object and illustrates an example of the configuration of resin particles 204 including a dye as a colorant. In this case, for example, the entire resin particle 204 may be colored by adding a dye to the resin particle 204. In this case, the solvent 202 may be directly colored by adding a dye to the solvent 202 on the outside of the resin particle 204. In this case, only one of the solvent 202 and the resin particle 204 may be colored with a dye or both may be colored with a dye. In another modification of the configuration of ink for an object, one or both of the solvent 202 and the resin particle 204 may be colored using both of a pigment and a dye.

As described above, in the present example, the liquid ejecting apparatus 10 is a building apparatus (3D printer) that builds a three-dimensional object 50. However, in a modification of the liquid ejecting apparatus 10, the liquid ejecting apparatus 10 may be used as an apparatus other than a building apparatus.

Figure 3A:
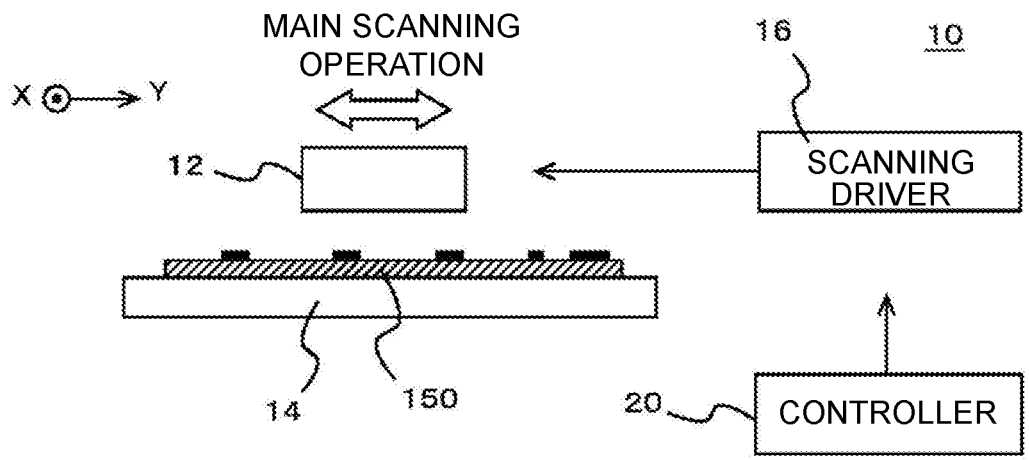
Figure 3B:
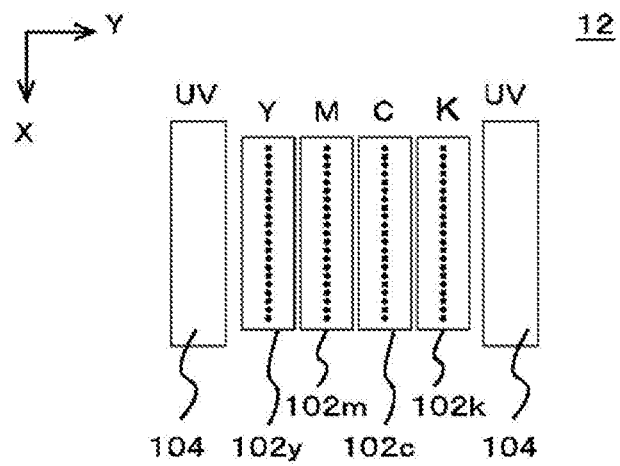
Figure 3C:
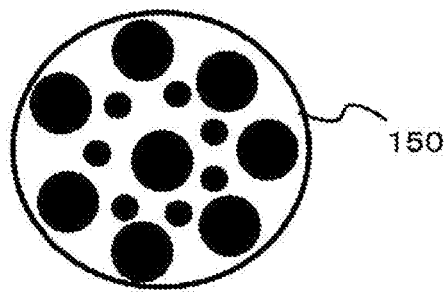

FIGS. 3A to 3C are diagrams illustrating a modification of the liquid ejecting apparatus 10. FIG. 3A illustrates an example of the configuration of the main part of the liquid ejecting apparatus 10 in the present modification. FIG. 3B illustrates an example of the configuration of the head 12 in the liquid ejecting apparatus 10. In FIGS. 3A to 3C, the configuration denoted by the same reference signs as in FIGS. 1A to 1C and FIGS. 2A to 2C may have the same or similar features as the configuration in FIGS. 1A to 1C and FIGS. 2A to 2C, except for the points described below.

In the present modification, the liquid ejecting apparatus 10 is a printing apparatus (inkjet printer) that prints a two-dimensional image and includes a head 12, a stage 14, a scanning driver 16, and a controller 20. The head 12 has a plurality of inkjet heads $102y$ to $102k$ and a plurality of ultraviolet ray irradiators 104. A plurality of inkjet heads $102y$ to $102k$ are inkjet heads that eject inks of colors Y, M, C, and K and eject ink toward a medium 150 to be printed. Also in the present modification, the inkjet heads $102y$ to $102k$ eject UV curable ink. In this case, the ink of each color Y, M, C, K includes a solvent 202 (see FIGS. 2A to 2C), resin particles 204 (see FIGS. 2A to 2C), cellulose fibers 206 (see FIGS. 2A to 2C), and a pigment 208 (see FIGS. 2A to 2C), for example, in the same manner as described with reference to FIG. 2B. The ink of each color may further include the same or similar components as known UV curable ink, in addition to these components. Also in the present modification, a plurality of ultraviolet ray irradiators 104 are disposed, for example, on one end side and the other end side in the main scanning direction of the head 12.

In the present modification, the stage 14 is a table-like member functioning as a platen of the inkjet printer. The medium 150 is placed on the upper surface of the stage 14 so that the medium 150 is supported so as to face the head 12. The scanning driver 16 allows the head 12 to perform a main scanning operation and a sub scanning operation and thereby allows the head 12 to eject ink to each position in the medium 150. The controller 20 controls each part of the liquid ejecting apparatus 10 based on data representing an image to be printed. According to the present modification, for example, printing on the medium 150 can be appropriately performed.

FIG. 3C illustrates an example of the printed matter printed by the liquid ejecting apparatus 10. As illustrated in the figure, according to the present modification, the liquid ejecting apparatus 10 can draw various images on the medium 150. In the present example, therefore, ink can be considered as, for example, a liquid for drawing an image on the medium 150. In this case, the use of ink including the cellulose fibers 206 can appropriately increase the strength of ink after changing into a solid state on the medium 150. In this case, the cellulose fibers 206 are contained in the resin particle 204, whereby ink can be ejected more appropriately. The present modification therefore can appropriately increase, for example, the strength of a printed matter. In this case, increasing the strength of a printed matter means, for example, increasing abrasion resistance and flexion resistance of ink adhering to the medium 150. In this case, printing can be performed more appropriately, for example, when printing is performed on the fibrous medium 150 that requires high abrasion resistance and flexion resistance, such as uniforms and sheet covers.

When the liquid ejecting apparatus 10 performs printing on the medium 150, for example, a two-dimensional color image may be printed. In a modification of the printing operation, for example, printing with an uneven surface may be performed on the medium 150. In this case, for example, printing with an uneven surface may be performed without using ink serving as a material of the support layer. More specifically, in this case, for example, three-dimensional printing (for example, decorative printing) may be performed by depositing a plurality of layers of ink on the medium 150. For example, a pattern with an uneven surface may be drawn by printing a color image having a surface uneven to some degree on the medium 150. In these cases, the strength of ink on the medium 150 can be appropriately increased by using ink including cellulose fibers 206, in the same manner as in building the object 50.

The features of ink used in the liquid ejecting apparatus 10 will now be described in more detail. In the following, the liquid ejecting apparatus 10 described with reference to FIGS. 1A to 1C and the liquid ejecting apparatus 10 described with reference to FIGS. 3A to 3C are collectively referred to as the liquid ejecting apparatus 10 in the present example, unless otherwise specified, for convenience of explanation. The ink used in the liquid ejecting apparatus 10 in the present example is referred to as ink used in the present example or ink in the present example.

Figure 4A:
Figure 4B:
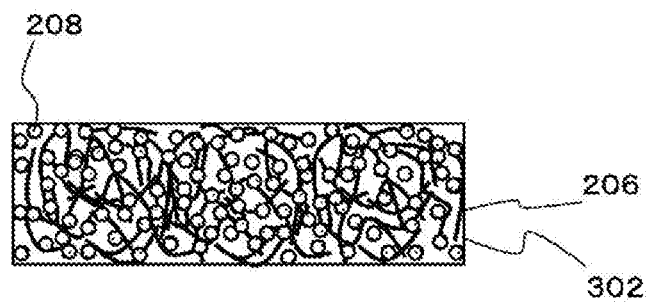

FIGS. 4A to 4D are diagrams illustrating ink used in the present example in more detail. FIGS. 4A and 4B illustrate an example of the state of ink in the present example after fixing. FIG. 4A is a diagram illustrating an example of the state after fixing of clear ink including no pigment 208 and illustrates an example of the state after the ink illustrated in FIG. 2A changes into a solid state. FIG. 4B is a diagram illustrating an example of the state after fixing of color ink that is ink including the pigment 208 and illustrates an example of the state after the ink illustrated in FIG. 2B changes into a solid state.

As described above, in the present example, for example, UV curable ink is used as the ink. In this case, since the ink substantially does not include an evaporative component, when irradiated with ultraviolet rays, the ink changes from liquid to a solid state without substantially changing its volume. More specifically, in this case, a curable substance (for example, monomer or oligomer) used as the solvent 202 is polymerized to form a resin part 302. In this case, for example, the resin particles 204 in the ink are included in the curable resin formed by curing and thereby constitute the resin part 302 together with the curable resin. Then, in this case, the ink after curing (curing and polymerization) substantially does not change in volume before and after curing and keeps the volume before curing, for example, as illustrated in FIGS. 4A and 4B. In this case, substantially not changing in volume means that, for example, the volume substantially does not change with accuracy equivalent to that of common UV curable ink. In this respect, UV curable ink can be considered as, for example, being particularly suitable when used as ink for building.

Ink other than UV curable ink may be used as the ink used in the liquid ejecting apparatus 10. More specifically, for example, ink including a solvent volatilized and removed after ejected from nozzles may be used as a modification of the ink used in the liquid ejecting apparatus 10. In this case, for example, both or one of an aqueous solvent such as water and an organic solvent (for example, non-aqueous organic solvent) may be used as the solvent.

More specifically, also in this case, for example, the ink includes a solvent 202 (see FIGS. 2A to 2C), resin particles 204 (see FIGS. 2A to 2C), and cellulose fibers 206, in the same manner as described with reference to FIGS. 2A to 2C. Color ink other than clear ink further includes a pigment 208 (see FIGS. 2A to 2C) depending on the color of the ink. Then, in this case, the solvent 202 is volatilized and removed, whereby the ink changes into a solid state and is then fixed.

Figure 4C:
Figure 4D:
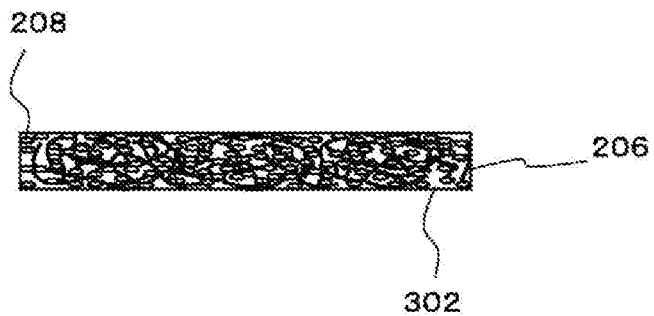

FIGS. 4C and 4D illustrate an example of the state after fixing of evaporation-drying ink which is ink fixed through evaporation and removal of the solvent 202. FIG. 4C illustrates an example of the state after fixing of clear ink including no pigment 208. FIG. 4D illustrates an example of the state after fixing of color ink including the pigment 208.

When evaporation-drying ink is used, the solvent which is the main component of the ink evaporates while the ink changes from liquid to solid. In this case, the resin part 302 is formed of the resin particles 204 after the solvent evaporates. The volume of the ink after fixing (after drying) therefore significantly decreases, for example, as illustrated in FIGS. 4C and 4D. In this case, the volume of the ink decreasing means that, for example, the volume decreases compared with when UV curable ink is cured. It is therefore preferable that such evaporation-drying ink is used in applications in which a volume change of ink during fixing does not matter, for example, when a flat color image is printed or when an image with a slightly uneven surface is printed. Such evaporation-drying ink may be used, for example, as ink for building, depending on the quality required for objects. In this case, it is preferable to set the thickness of layers of ink added one after another, considering the amount of decrease in volume due to evaporation of the solvent.

When such evaporation-drying ink is used, for example, a drying device for drying ink having been ejected from nozzles may be used as a fixing device for ink in the liquid ejecting apparatus 10. With such a configuration, for example, ink can be appropriately changed into a solid state. For example, a variety of known heaters can be used as the drying device.

Ink that produces heat by itself by radiation of energy rays (fast-drying ink) has been actively developed as evaporation-drying ink. More specifically, for example, ink disclosed in WO2017/135425 is known as such fast-drying ink. Such fast-drying ink may be used as the ink used in the liquid ejecting apparatus 10 in the present example. In this case, the ink further includes, for example, an exothermic substance that absorbs energy rays to produce heat, in addition to the solvent 202, the resin particles 204, and the cellulose fibers 206. In this case, for example, a configuration that irradiates ink with energy rays to produce heat from the ink may be used as the drying device for ink. In this case, the drying device irradiates ink with energy rays to dry and change the ink into a solid state. With such a configuration, for example, ink can be dried appropriately in a short time.

For example, ultraviolet rays can be suitably used as such energy rays. In this case, a UV light source that irradiates the landed ink with ultraviolet rays is used as the drying device for ink. For example, the same or similar configuration as the ultraviolet ray irradiator 104 described with reference to FIGS. 1A to 1C and FIGS. 3A to 3C can be suitably used as such a UV light source. When ultraviolet rays are used as energy rays, for example, UV fast-drying ink can be suitably used as the ink. UV fast-drying ink refers to, for example, ink that includes water or an organic solvent including an ultraviolet ray absorber (UV absorber) as a solvent (main solvent) and thereby evaporates and dries by radiation of ultraviolet rays. In this case, the ultraviolet ray absorber is an example of the exothermic substance and absorbs ultraviolet rays to produce heat.

When such fast-drying ink is used, ink can be dried in a short time and therefore, for example, smearing can be prevented appropriately. For this reason, such ink can be suitably used, for example, in the application in which a plurality of layers of ink are added one after another. In this case, for example, layers of ink are formed while being irradiated with ultraviolet rays, whereby the layers of ink can be dried appropriately, for example, at least to such an extent that adding the next layer of ink does not cause a problem. In this case, it is preferable that the solvent left in the ink is completely evaporated until production of a printed matter is completed, by further heating the ink after all the layers of ink are formed.

Supplemental description as to the configurations described above, further modifications, and the like will now be described. As for the configuration of ink including a pigment 208 in the foregoing description, the pigment 208 is added such that the pigment 208 is included both on the inside and on the outside of the resin particle 204 as illustrated in FIG. 2B and the like. As a modification of the ink described above, the pigment 208 may be added such that the pigment 208 is included on only one of the inside and the outside of the resin particles 204.

FIGS. 5A to 5D are diagrams illustrating a modification of the ink and illustrate an example of the configuration of ink in which the pigment 208 is added such that the pigment 208 is included on only one of the inside or the outside of the resin particles 204. In FIGS. 5A to 5D, the configuration denoted by the same reference signs as in FIGS. 1A to 1C to FIGS. 4A to 4D may have the same or similar features as the configuration in FIGS. 1A to 1C to FIGS. 4A to 4D, except for the points described below.

Figure 5A:
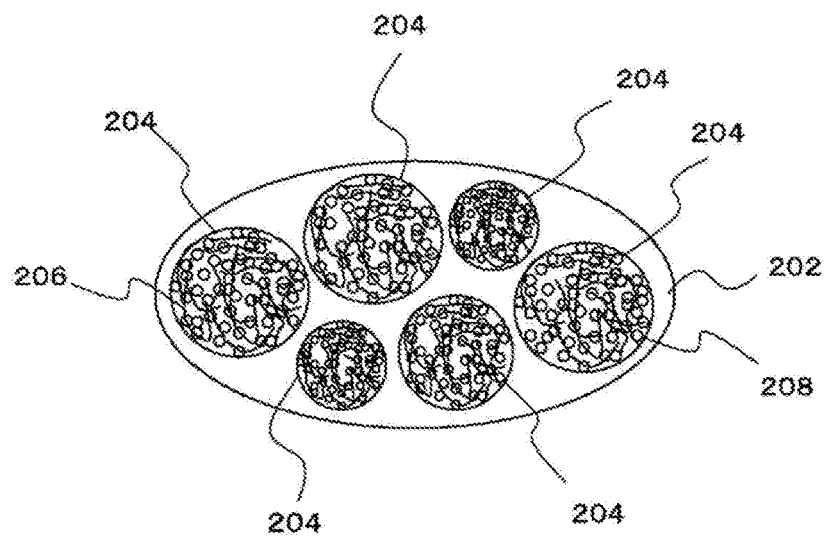
Figure 5B:
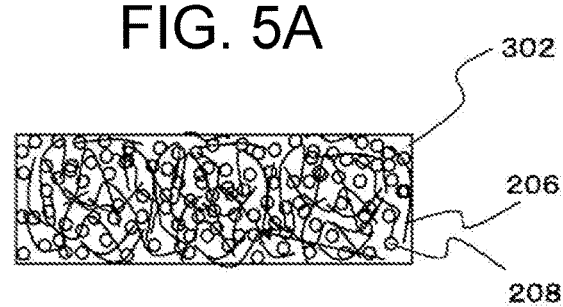
Figure 5C:
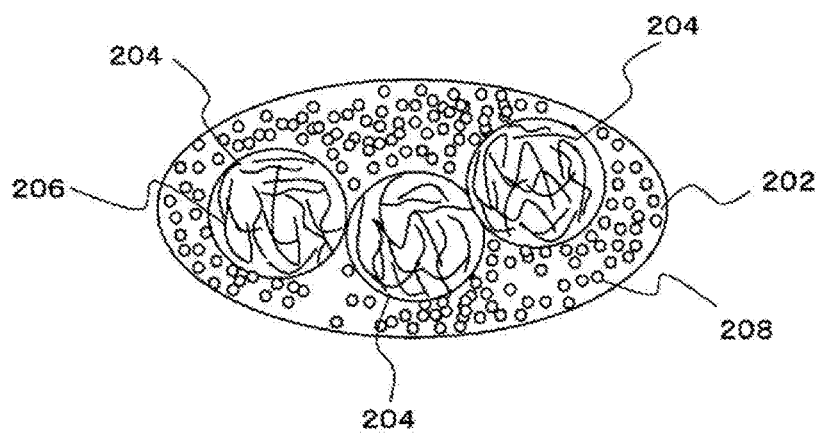
Figure 5D:
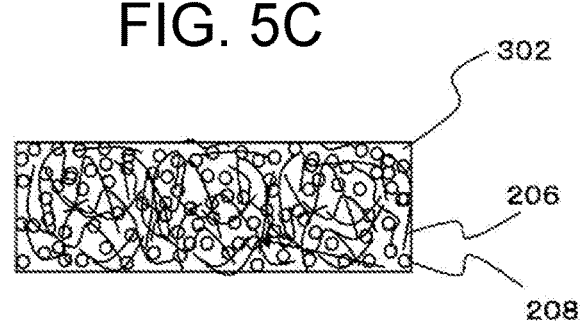

FIG. 5A illustrates an example of the configuration of ink in which the pigment 208 is added such that the pigment 208 is included only on the inside of the resin particle 204. FIG. 5B illustrates an example of the state after fixing of the ink illustrated in FIG. 5A. FIG. 5C illustrates an example of the configuration of ink in which the pigment 208 is added such that the pigment 208 is included only on the outside of the resin particle 204. FIG. 5D illustrates an example of the state after fixing of the ink illustrated in FIG. 5C. In these cases, the resin particles 204 containing cellulose fibers 206 are used, whereby ink including cellulose fibers 206 can be appropriately used while ejection failure is prevented appropriately.

An exemplary configuration of the printing apparatus (inkjet printer) that prints a two-dimensional image has been described above with reference to FIGS. 3A to 3C as a modification of the liquid ejecting apparatus 10. The configuration of the liquid ejecting apparatus 10 as a printing apparatus is not limited to the configuration illustrated in FIGS. 3A to 3C, and various known inkjet printers modified so as to use the ink described above can be used. In this case, various known inkjet printers include, for example, compact personal printers and printers for sign graphics with a large width. Known inkjet printers include, for example, textile printers and printers used in the field of digitalization of printing technology. In known inkjet printers, for example, solvent ink, latex, water-based ink, and UV curable ink are widely used. For example, the liquid ejecting apparatus 10 having a configuration illustrated in FIG. 6 may be used as the liquid ejecting apparatus 10 adapted to these modifications.

Figure 6:
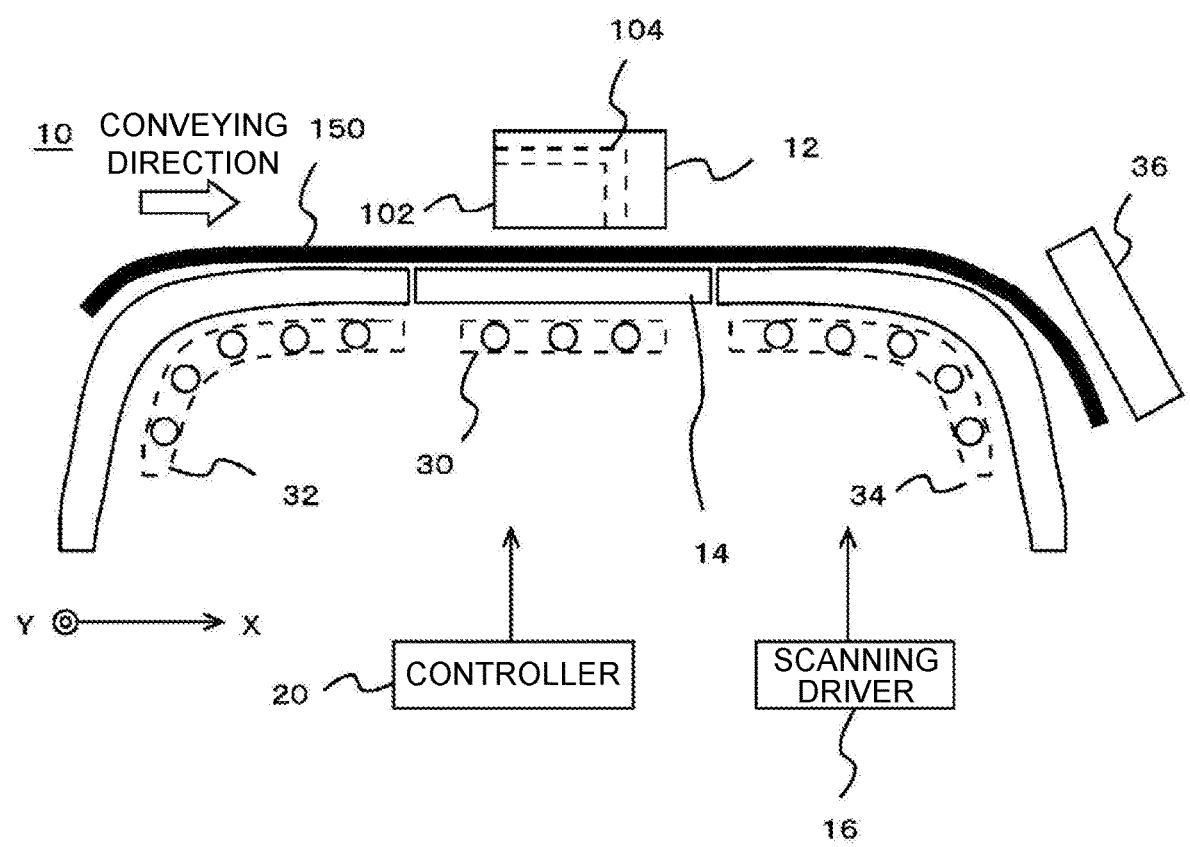
FIG. 6 is a diagram illustrating an example of the configuration of the main part in another modification of the liquid ejecting apparatus 10.

FIG. 6 illustrates an example of the configuration of the main part in another modification of the liquid ejecting apparatus 10. In the present modification, the liquid ejecting apparatus 10 is a printing apparatus (inkjet printer) that prints a two-dimensional image and uses ink including the resin particles 204 containing the cellulose fibers 206 as described above. Fast-drying ink that produces heat by radiation of ultraviolet rays is used as such ink. In FIG. 6, the configuration denoted by the same reference signs as in FIGS. 1A to 1C to FIGS. 5A to 5D may have the same or similar features as the configuration in FIGS. 1A to 1C to FIGS. 5A to 5D, except for the points described below.

In the present modification, the liquid ejecting apparatus 10 includes a head 12, a stage 14, a scanning driver 16, a print heater 30, a preheater 32, an after heater 34, and an infrared heater 36. The head 12 has an inkjet head 102 and an ultraviolet ray irradiator 104. In FIG. 6, the inkjet head 102 and the ultraviolet ray irradiator 104 in the head 12 are illustrated in a simplified manner, for convenience of illustration. However, in the actual configuration, the head 12 may have a plurality of inkjet heads 102 (inkjet heads 102y to 102k), for example, in the same or similar manner as illustrated in FIG. 3B. In the present modification, the ultraviolet ray irradiator 104 irradiates ink on the medium 150 with ultraviolet rays to produce heat from the ink. At least part of the solvent in the ink is thus evaporated to increase the viscosity of the ink. In this case, the ultraviolet ray irradiator 104 can be considered as an example of the heater for heating ink. The ultraviolet ray irradiator 104 may be considered as, for example, a UV fast-drying device which is a device that dries ink by radiation of ultraviolet rays. For example, a UV LED is preferably used as the ultraviolet ray irradiator 104.

The print heater 30, the preheater 32, the after heater 34, and the infrared heater 36 are heater for heating the medium 150. Of these, the print heater 30, the preheater 32, and the after heater 34 are disposed on the back surface side of the printed surface of the medium 150. In this case, the print heater 30 is disposed at a position facing the head 12. The preheater 32 is disposed upstream from the print heater 30 in the conveying direction of the medium 150. The after heater 34 is disposed downstream from the print heater 30 in the conveying direction of the medium 150. The infrared heater 36 is a heater that heats the printed surface of the medium 150 downstream from the head 12 in the conveying direction of the medium 150. In this case, the infrared heater 36 can be considered as, for example, an after heater on the printed surface side of the medium 150. These heaters can be additionally used to dry the ink on the medium 150 more reliably and appropriately. In another modification of the configuration of the liquid ejecting apparatus 10, for example, a hot air-blowing heater or a heat-transfer heater may be used in place of the infrared heater 36.

In another modification of the liquid ejecting apparatus 10, for example, the configuration of the liquid ejecting apparatus 10 may be further modified according to ink to be used. For example, when ink that is cured by radiation of ultraviolet rays is used, a UV light source may be used in place of the infrared heater 36. In this case, a UV light source disposed downstream from the head 12 in the conveying direction of the medium 150 may be considered as, for example, a UV curing device for completing curing of ink.

As described above, ink including cellulose fibers is used in the present example. In this case, cellulose fibers can be considered as, for example, a component for increasing the strength of ink after fixing. Increasing the strength of ink after fixing means that, for example, when the strength after fixing of ink under the same conditions except for the presence/absence of cellulose fibers is compared, ink including cellulose fibers has a higher strength. In this case, cellulose fibers can be considered as, for example, a filler (cellulose filler) for reinforcement for increasing the strength of ink. Then, in this case, appropriately increasing the strength of ink after fixing can appropriately increase, for example, the strength of layers of ink that constitute an object or the strength of layers of ink formed on a medium. This configuration can appropriately increase the strength of an object, for example, compared with when an object is built using conventional ink. Ink can be used more appropriately, for example, in applications that require a strong layer of ink, other than building an object. More specifically, in this case, for example, layers of ink excellent in mechanical strength, flexibility, resistance to bending, and abrasion resistance can be formed appropriately.

In this case, cellulose fibers are not merely added in ink but cellulose fibers contained in resin particles are added in ink, whereby ejection failure can also be prevented. Accordingly, cellulose fibers, which are difficult to use when directly added, can be appropriately included in ink. In this case, for example, transparent cellulose fibers can be suitably used as the cellulose fibers. In this case, cellulose fibers being transparent means, for example, being considered as being substantially transparent depending on the quality required for building, printing, and the like. With such a configuration, cellulose fibers can be appropriately included in the ink, for example, while the effect on the color of ink is suppressed. Color cellulose fibers may be used depending on the quality required for building, printing, and the like. As described above, in the present example, cellulose fibers is an example of the fibrous substance. In a modification of ink, a fibrous substance other than cellulose fibers may be used as the fibrous substance contained in resin particles. As the fibrous substance, for example, nanofibers of natural fibers or synthetic fibers can be suitably used. In this case, transparent cellulose nanofibers can be used suitably in particular for color inks. In the case of black ink or ink for forming a structure of an object (for structure), for example, carbon nanofibers or glass fibers may be used.

As described above, for example, UV curable ink or fast-drying ink can be suitably used as the ink used in the liquid ejecting apparatus 10. For example, latex ink (UV fast-drying latex ink) that produces heat by radiation of ultraviolet rays can be suitably used as the fast-drying ink. In the liquid ejecting apparatus 10, ink other than those above may be used as the ink including resin particles and cellulose fibers. More specifically, for example, solvent UV ink (SUV ink) which is UV curable ink diluted by a solvent and latex ink to be dried by a heater can also be used suitably. In addition, for example, ink that includes resin particles containing cellulose fibers in a variety of known inks may be used.

In the liquid ejecting apparatus 10, for example, nano pigment-added latex ink including cellulose nanofibers (CNF), a large molecular-weight oligomer including cellulose nanofibers (CNF), latex, or ink having thermoplastic resin dispersed therein may be used as the fast-drying ink. In this case, for example, as described below, ink is formed into a coat on the medium to achieve high gloss. Such ink therefore can be considered as, for example, nanofiber-added glossy ink.

More specifically, as an example of such ink, for example, ink including particles of a thermal softening resin (thermal softening resin particle) as resin particles 204 (hereinafter referred to as ink of type A) may be used. In this case, thermal softening resin refers to, for example, a resin that is softened by heat. As the resin that is softened by heat, for example, thermoplastic resin, hot-melt resin, or thermosetting resin can be used. More specifically, for example, polyester, melamine, butyral, acrylic resin, epoxy resin, or urethane resin may be used as the thermal softening resin in ink of type A. Ink of type A can be considered as, for example, ink in which resin particles insoluble in a solvent are dispersed as dispersed resin particles in a solid state or in a semi-solid state. As used herein, being dispersed in a solid state means, for example, being dispersed in a colloid state or a suspension state. Being dispersed in a semi-solid state means, for example, not being solid and being dispersed with a viscosity of 100 mPa·sec or more (preferably, 1000 mPa·sec or more). The resin particles 204 may be present, for example, in an emulsion state in a solvent. In ink of type A, for example, an organic solvent, water, or a mixture liquid thereof may be used as the solvent.

In ink of type A, the resin particles 204 which are dispersed resin particles contain the cellulose fibers 206 as described above. For example, cellulose nanofibers are used as the cellulose fibers 206. As a specific configuration of ink of type A, for example, the configuration described above with reference to FIGS. 2A to 2C, FIGS. 4A to 4D, and FIGS. 5A to 5D can be suitably used.

Ink of type A further includes an ultraviolet ray absorber and produces heat by itself by heat produced by the ultraviolet ray absorber absorbing ultraviolet rays. With such a configuration, for example, when the liquid ejecting apparatus 10 is used as a printing apparatus, the solvent in the ink is evaporated in a short time, thereby appropriately preventing smearing. With this configuration, for example, even when a non-absorbing medium such as plastic film or a highly absorbing medium such as paper or cloth is used, printing can be performed appropriately with minimal smearing.

Ink of type A can be used suitably, for example, in the liquid ejecting apparatus 10 having a configuration described with reference to FIG. 6. In this case, for example, printing of a color image may be performed by ejecting ink from the inkjet head 102 (see FIG. 6) to a medium heated at a low temperature by the print heater 30 (see FIG. 6). In this case, the ultraviolet ray irradiator 104 (see FIG. 6) emits ultraviolet rays to evaporate the solvent in ink on the medium in a short time by the fast-drying method, thereby appropriately preventing smearing. In this case, for example, the infrared heater 36 (see FIG. 6) used as an after heater heats the ink on the medium at a high temperature (for example, 90° C. or higher). As for ink of type A, heating the ink at a high temperature means, for example, that heating is performed at equal to or higher than a temperature that softens the thermal softening resin used as the resin particles 204 to form a coat. More specifically, in this case, for example, heating may be performed at equal to or higher than the softening temperature of thermoplastic resin or at equal to or higher than the melting point of hot-melt resin. In this case, the operation of heating performed by the infrared heater 36 may be considered as, for example, the operation of completely drying ink at the position of the after heater to fix the ink on the medium (post complete dry fixing).

With such a configuration, for example, ink including the cellulose fibers 206 can be formed into a coat and flattened. In addition, the effect of degassing due to heating and densification involved with formation of a coat can increase adhesion of ink to the medium. With such a configuration, for example, when an image is printed using ink of type A, for example, a high strength coat can be formed on a medium using ink including the cellulose fibers 206. For example, high-quality printing thus can be performed appropriately.

In the liquid ejecting apparatus 10, ink (hereinafter referred to as ink of type B) including particles of latex resin or synthetic latex resin in place of particles of thermal softening resin in ink of type A may be used as the fast-drying ink. Ink of type B may be considered as, for example, ink in which the resin particles 204 are formed of latex resin or synthetic latex resin. It is preferable that a liquid including water as the main component is used as a solvent in ink of type B.

Ink of type B includes latex resin or the like and therefore the heating temperature (fixing temperature) can be lower than ink of type A, for example, even when ink on the medium is formed into a coat and fixed. More specifically, ink of type B can also be suitably used in the liquid ejecting apparatus 10, for example, having a configuration described with reference to FIG. 6. When ink of type B is used, heating performed by the infrared heater 36 (post complete dry fixing) may be performed, for example, at intermediate temperatures of about 60° C. or higher. Even with such a configuration, a high-strength coat can be formed on a medium using ink including cellulose fibers 206.

In the liquid ejecting apparatus 10, ink (hereinafter referred to as ink of type C) including particles of ultraviolet curable resin (UV curable resin) in place of particles of thermal softening resin in ink of type A may be used as the fast-drying ink. In this case, for example, particles including one or both of insoluble and ultraviolet-curable monomer and oligomer as the main component can be used as particles of UV curable resin. Ink of type C can be considered as, for example, fast-drying ink that produces heat by radiation of ultraviolet rays and in which the component of ink, namely, the resin particles 204 are polymerized and cured by radiation of ultraviolet rays. Ink of type C basically has, for example, the same or similar basic configuration (physical configuration) as ink of type A or type B and can be considered as ink in which the resin used as the resin particles 204 is a monomer or an oligomer that is ultraviolet curable resin before curing.

Ink of type C can be suitably used, for example, in the liquid ejecting apparatus 10 having a partially modified configuration of the configuration of the liquid ejecting apparatus 10 described with reference to FIG. 6. In this case, for example, an ultraviolet ray emitting device may be used in place of the infrared heater 36 in the configuration in FIG. 6. In this case, the ultraviolet ray irradiator 104 (see FIG. 6) in the head 12 can be considered as, for example, a configuration of emitting ultraviolet rays mainly for drying ink fast. The ultraviolet ray emitting device used in place of the infrared heater 36 can be considered as, for example, a configuration that emits ultraviolet rays for curing the resin particles 204.

More specifically, in this case, for example, ink is ejected from the inkjet head 102 to the medium while being heated by the print heater 30 at low temperatures. The ultraviolet ray irradiator 104 in the head 12 emits ultraviolet rays immediately after landing of ink to evaporate the solvent in the ink, thereby preventing smearing. When ink of type C is used, radiation of ultraviolet rays by the ultraviolet ray irradiator 104 further temporarily cures the ink. In this case, temporarily curing ink means, for example, curing ink to a state in which ink is not completely cured but the viscosity is increased. When the speed of printing is sufficiently low and smearing does not matter even without radiation of ultraviolet rays by the ultraviolet ray irradiator 104, for example, as in the printing with many passes in the multi-pass method, radiation of ultraviolet rays by the ultraviolet ray irradiator 104 may be omitted.

In this case, the after heater 34 (see FIG. 6) downstream from the head 12 in the conveying direction performs heating (post heating), for example, at intermediate temperatures of about 60° C. or higher to evaporate the remaining solvent in the ink, thereby completely drying the ink. After heating by the after heater 34 or concurrently with heating, the ultraviolet ray emitting device emits ultraviolet rays to fully cure the ink. In this case, fully curing the ink means, for example, that curing of ink proceeds sufficiently and curing is completed. Even with such a configuration, a high-strength coat can be formed on the medium using ink including the cellulose fibers 206.

As described above, inks of types A to C can be used to appropriately form a high-strength ink coat (tough print layer) on the medium. In a specific configuration of inks of types A to C, for example, a variety of additives such as disperser and thickener may be further added in addition to the components above, in the same manner as in known inks (inkjet ink). In order to further increase flatness and gloss of a layer of ink at the time of fixing, for example, paraffin or wax with a low melting point may be further added in ink (for example, in resin particles).

Here, as described above, when fast-drying ink is used, printing can be performed appropriately with minimal smearing on various media. The fast-drying ink as described above therefore can find a variety of applications including, for example, soft packaging, architectural materials such as interior materials and exterior materials, and textile prints. In the fast-drying ink as described above, the solvent that is the main component evaporates during fixing, so that the volume of ink after fixing (after drying) is significantly reduced. These inks therefore can be suitably used in particular, for example, for printing a flat color image.

In some applications of ink, it may be required to prevent reduction in volume of ink after fixing. Then, in such a case, UV curable ink may be used, as described above. In this case, ink that substantially does not include an evaporative component can be used to appropriately keep the volume of ink after curing. UV curable ink therefore can be suitably used for building an object as described above. UV curable ink can be suitably used also for printing a raised image on a medium. Printing a raised image on a medium means, for example, producing a 2.5D product by forming a three-dimensional object on a medium.

Inks of types A to C as well as various inks as described above can be stably ejected from the inkjet heads as described above because transparent and flexible cellulose nanofibers are contained in the resin particles 204. In this case, the inclusion of cellulose nanofibers in ink enables printing excellent in mechanical strength, flexibility, resistance to bending, abrasion resistance, and color rendering. In this case, not only when a two-dimensional image is simply printed but also when a three-dimensional object is built (3D printing) or raised printing (2.5D printing) is performed, highly durable products can be produced by taking advantage of the toughness of ink.

However, in some applications of printing and building, ink is required to have higher rub-fastness, durability, toughness, or weatherability. Then, in this case, a component for increasing the strength of ink may be further added to ink. For example, an inorganic pigment may be used as such a component. More specifically, when ink including the cellulose fibers 206 is used, the ink can be considered as being soft and resistant to bending, for example, after fixing. As a result, the layer of ink formed may be, for example, less prone to cracking or breaking. However, also in this case, when something hard touches the surface of the layer of ink, damage or the like is likely to occur. Consequently, some applications of ink require higher rub-fastness.

By contrast, for example, when a colorless inorganic pigment is further added to ink, the ink after fixing is harder, whereby ink achieves higher strength and increased rub-fastness. For example, a transparent or white inorganic pigment can be suitably used as such a colorless inorganic pigment. As used herein, inorganic pigment being colorless or transparent means, for example, being substantially colorless or transparent so as to sufficiently reduce the effect on the color of ink.

In this case, for example, such an inorganic pigment can be considered as an extender pigment for increasing the strength of ink. For example, nano-sized particles of an inorganic substance with an average particle size of 1 μm or less can be suitably used as such an extender pigment. For example, zinc oxide, silicon oxide, calcium carbonate, barium sulfate, and aluminum oxide can be suitably used as the inorganic substance. It is more preferable that, for example, a nano pigment such as nanosilica is used as such an extender pigment. Such a substance can be used as an extender pigment to make the ink after fixing harder and appropriately increase rub-fastness and the like while keeping the transparency of ink appropriately high.

As described above, in general, if a solid additive is added to ink used in inkjet heads, ejection failure is likely to occur. However, when the inorganic pigment as described above is added, the effect on ejection stability is ignorable, for example, unlike when a polymer resin is added. For example, a metal oxide (for example, zinc oxide) that absorbs ultraviolet rays to produce heat may be used as such an inorganic pigment. In this case, the inorganic pigment can also be used as an ultraviolet ray absorber that heats ink in the fast-drying ink.

Figure 7A:
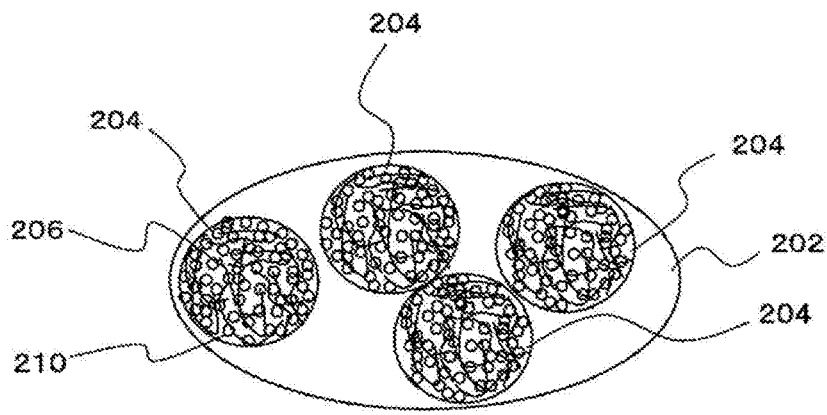
Figure 7B:
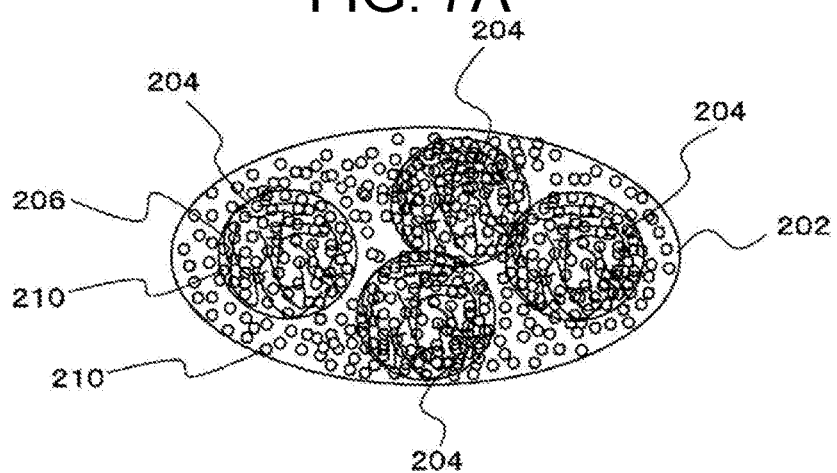
Figure 7C:
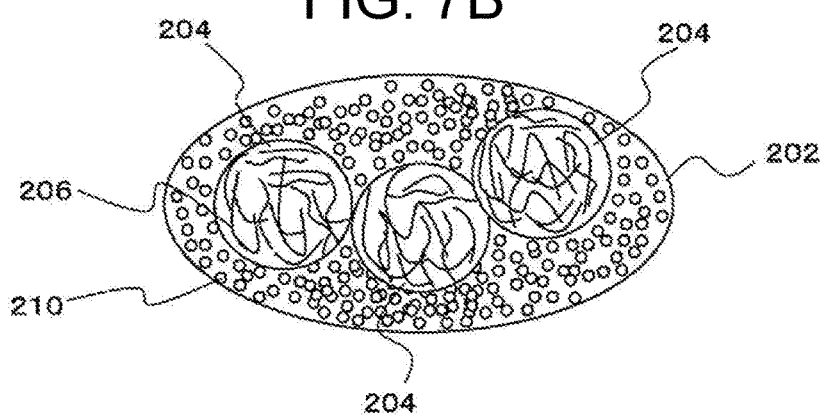
Figure 7D:
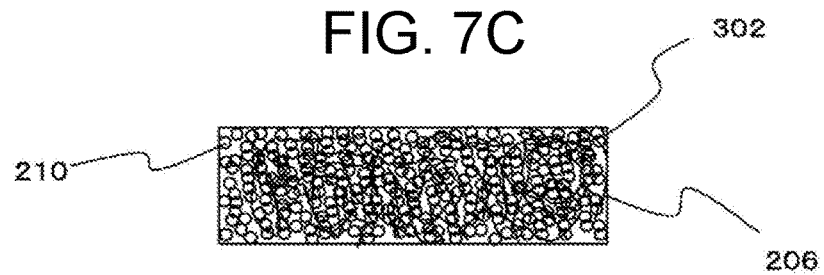

In this case, the inorganic pigment (extender pigment) may be added, for example, as illustrated in FIGS. 7A to 7D. FIGS. 7A to 7D are diagrams illustrating a configuration of ink further including an inorganic pigment as an extender pigment. FIGS. 7A to 7C illustrate an example of the configuration of ink further including an extender pigment 210. FIG. 7D illustrates an example of the state of fixing of ink further including the extender pigment 210.

In FIGS. 7A to 7D, the configuration denoted by the same reference signs as in FIGS. 1A to 1C to FIG. 6 may have the same or similar features as the configuration in FIGS. 1A to 1C to FIG. 6, except for the points described below. FIGS. 7A to 7D illustrate an example of the configuration of ink in which only the colorless extender pigment 210 for increasing the strength of ink is added without adding a pigment 208 (see FIGS. 2A to 2C) used as a colorant, for convenience of illustration. In this case, the configuration of ink illustrated in the figures can be considered as, for example, an example of the configuration of clear ink. When color ink other than clear ink is used, the pigment 208 exhibiting the color of ink may be further added. In this case, the pigment 208 may be added inside the resin particles 204, outside the resin particles 204, or both, as described above. Also in this case, a nano pigment (color nano pigment) can be suitably used as the pigment 208. When the extender pigment 210 is further added, a dye may be used as a colorant. In this case, the resin particles 204 colored with a dye may be used.

As illustrated in the figures, when the extender pigment 210 is added to ink, the ink includes a solvent 202, resin particles 204, cellulose fibers 206, and the extender pigment 210. Also in this case, the cellulose fibers 206 are contained in the resin particle 204. The extender pigment 210 may be contained in the cellulose fibers 206, for example, as illustrated in FIG. 7A. With such a configuration, for example, agglomeration of the extender pigment 210 can be prevented more appropriately. The extender pigment 210 may be directly added into the solvent 202. In this case, for example, as illustrated in FIG. 7B, the extender pigment 210 may be added both inside the resin particle 204 and outside the resin particle 204, or as illustrated in FIG. 7C, the extender pigment 210 may be added only outside the resin particle 204.

When these inks are used, the state of fixing is, for example, as illustrated in FIG. 7D. In this case, the resin part 302 is formed so as to include the extender pigment 210, whereby, for example, rub-fastness can be increased more appropriately. Because of the increased rub-fastness in this manner, the ink including the cellulose fibers 206 can be used in a wider variety of applications. More specifically, for example, ink including the cellulose fibers 206 and the extender pigment 210 can be suitably used in the fields that require a strong layer of ink, such as application in indoor and outdoor sign graphics. The ink can also be suitably used as ink for printing for wallpapers and various architectural materials for indoor and outdoor use. Other suitable applications include those that require high abrasion resistance and flexion resistance, such as printing on durable textile such as canvas and sheet covers. The extender pigment 210 may be added to ink for building an object or ink for decorative printing. Clear ink further including the extender pigment 210 can be used to perform printing, for example, as if transparent varnish is applied. Color ink further including a pigment 208 of each color can be used to perform, for example, stained-glass-like printing in glossy color printing.

Figure 8:
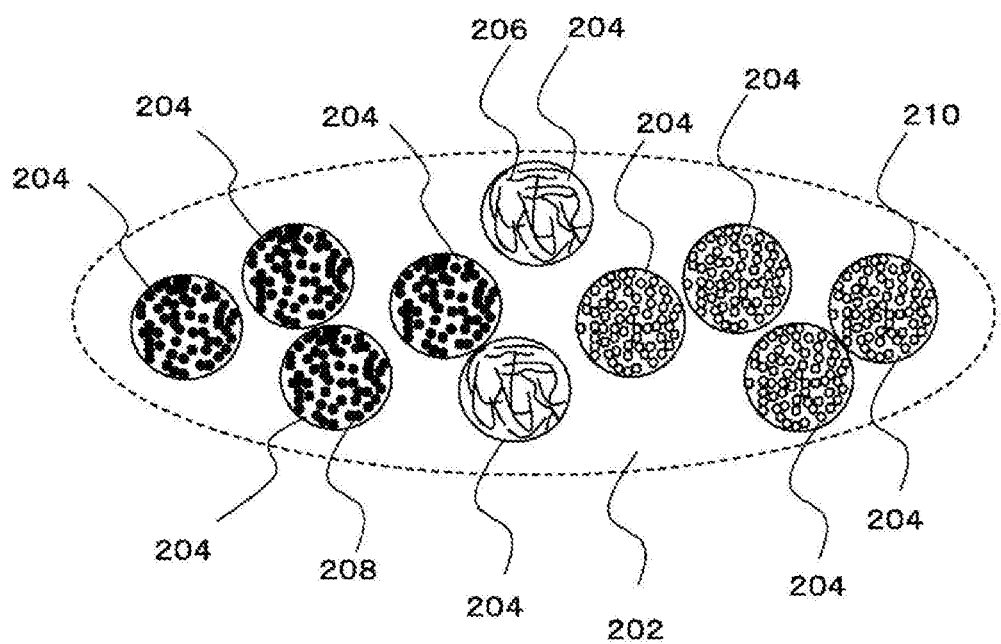
FIG. 8 is a diagram illustrating another modification of the configuration of ink.

In a further modification of the configuration of ink, for example, as illustrated in FIG. 8, cellulose fibers 206, a pigment 208 for colorant, and an extender pigment 210 may be contained in different resin particles 204. FIG. 8 illustrates another modification of the configuration of ink. Also in this case, ink including the cellulose fibers 206 and the extender pigment 210 can be used appropriately.

The color of ink to be used, the arrangement of inkjet heads, and the like are not limited to the configurations described above and may be modified in various ways. For example, color inks combined as basic colors are not limited to four colors Y, M, C, and K. Seven or more colors, such as Y, M, C, R, G, B, and K may be used. In addition to inks of basic colors, for example, inks of special colors, such as white, metallic colors, fluorescent colors, or orange color may be used. In this case, it is preferable that the inkjet heads for primary colors Y, M, C and the inkjet heads for secondary colors R, G, B are disposed so as to be shifted in position in the sub scanning direction. In this case, the row of inkjet heads for colors Y, M, C can be considered as a first axis. The row of inkjet heads for colors R, G, B can be considered as a second axis. In this case, it is preferable that the inkjet head for tertiary color K is also disposed on a third axis so as to be shifted in position in the sub scanning direction from the inkjet heads for primary and secondary colors. It is preferable that the inkjet head for special color is also disposed, for example, so as to be shifted in position in the sub scanning direction from the inkjet heads for primary and secondary colors. In this case, the inkjet head for special color may be disposed on a fourth axis, for example, so as to be shifted in position in the sub scanning direction from the inkjet head for tertiary color. The inkjet head for special color may be disposed on the same axis as the inkjet heads for primary colors, secondary colors, or tertiary color, depending on the frequency of use of special color ink and the probability that the ink is ejected so as to overlay ink of another color at the same ejection position. Specific operation in building an object or printing a two-dimensional image is not limited to the operation by the multi-pass method and may be applied to a configuration for building or printing in one pass (for example, line printer).

INDUSTRIAL APPLICABILITY

The present disclosure is suitably used, for example, in a liquid ejecting apparatus.

What is claimed is:

1. A liquid ejecting method of ejecting an ink by an inkjet method, comprising:
    ejecting the ink by an inkjet head,
    wherein
    the inkjet head has a nozzle configured to eject the ink,
    the ink includes a resin particle having a size capable of passing through the nozzle, and
    the resin particle contains a fibrous substance,
    wherein the fibrous substance is disposed inside the resin particle, and
    the resin particle is configured to hold the fibrous substance so as to wrap the fibrous substance inside.

2. An ink for an inkjet head, and the inkjet head is configured to eject the ink from a nozzle by an inkjet method, and the ink comprising:
    a resin particle having a size capable of passing through the nozzle, wherein
    the resin particle contains a fibrous substance,
    wherein the fibrous substance is disposed inside the resin particle, and
    the resin particle is configured to hold the fibrous substance so as to wrap the fibrous substance inside.

3. The ink according to claim 2, wherein
    the fibrous substance is fibers of cellulose.

* * * * *